ced by examiner

(12) United States Patent
De et al.

(10) Patent No.: US 8,255,594 B2
(45) Date of Patent: Aug. 28, 2012

(54) HANDLING LEGACY BIOS SERVICES FOR MASS STORAGE DEVICES USING SYSTEMS MANAGEMENT INTERRUPTS WITH OR WITHOUT WAITING FOR DATA TRANSFERRED TO MASS STORAGE DEVICES

(75) Inventors: Debkumar De, Lakewood, WA (US); Giri P. Mudusuru, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 12/587,908

(22) Filed: Oct. 15, 2009

(65) Prior Publication Data

US 2011/0093627 A1     Apr. 21, 2011

(51) Int. Cl.
  *G06F 13/00*   (2006.01)
  *G06F 12/00*   (2006.01)
  *G06F 13/24*   (2006.01)
(52) U.S. Cl. ............... 710/33; 710/34; 710/260; 714/5; 714/8; 714/11; 711/104; 711/260; 711/E12.001
(58) Field of Classification Search .................... 710/33, 710/34, 260; 714/5, 8, 11
See application file for complete search history.

(56) References Cited

U.S. PATENT DOCUMENTS

| 7,433,985 | B2 * | 10/2008 | Ayyar et al. | 710/260 |
| 7,523,284 | B1 * | 4/2009 | Wilson | 711/170 |
| 7,831,858 | B2 * | 11/2010 | Rothman et al. | 714/5.11 |
| 2011/0055469 | A1 * | 3/2011 | Natu et al. | 711/105 |

* cited by examiner

*Primary Examiner* — Tammara Peyton
(74) *Attorney, Agent, or Firm* — Blakely, Sokoloff, Taylor & Zafman LLP

(57) ABSTRACT

A method, system, and computer program product containing instructions for handling legacy BIOS services for mass storage devices using system management interrupts. In response to receiving a request for an input/output service, a system management interrupt is generated to enter system management mode. A system management RAM (SMRAM) is accessible to code executing inside system management mode. Sub-operations to perform the requested service are identified, and code is executed outside the SMRAM to perform a sub-operation to fulfill the request. The sub-operations identified for execution outside SMRAM include any sub-operations that require waiting for data to be transferred. Other code executing inside the SMRAM may perform additional sub-operations that do not require waiting for data transfers to fulfill the request. System management mode is exited before invoking the code to perform the sub-operation to execute outside the SMRAM.

18 Claims, 6 Drawing Sheets

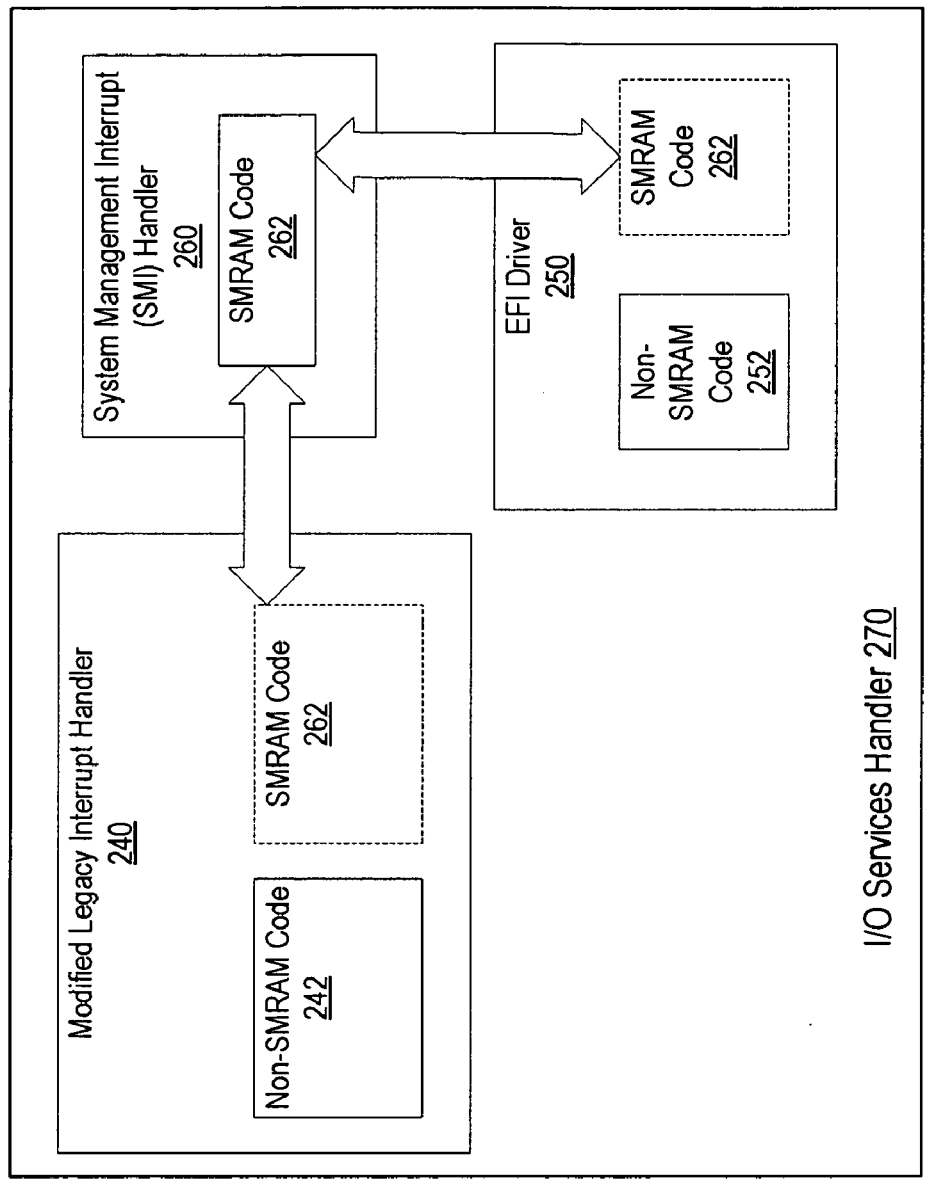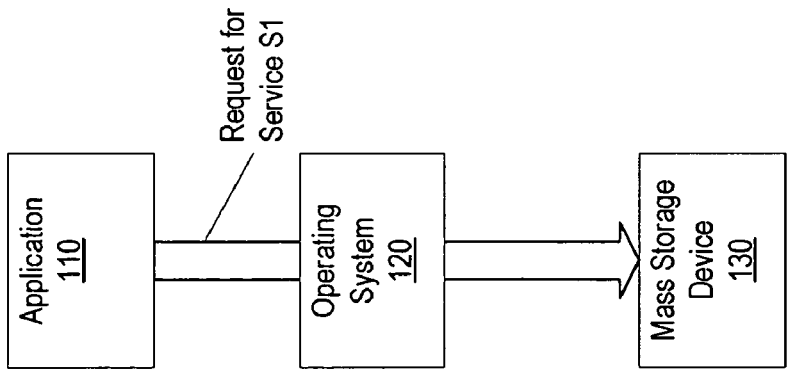
FIG. 2A

| Field Name | Description | Offset | Length |
|---|---|---|---|
| dSignature | Signature indicating the direction of information flow | 00h | 4 bytes |
| dEAX | Register EAX | 04h | 4 bytes |
| dEBX | Register EBX | 08h | 4 bytes |
| dECX | Register ECX | 0Ch | 4 bytes |
| dEDX | Register EDX | 10h | 4 bytes |
| dESI | Register ESI | 14h | 4 bytes |
| dEDI | Register EDI | 18h | 4 bytes |
| dEBP | Register EBP | 1Ch | 4 bytes |
| wDS | Register DS | 20h | 2 bytes |
| wES | Register ES | 22h | 2 bytes |
| bReturnStatus | Status to be returned in register AH | 24h | 1 byte |
| bExeState | Execution State | 25h | 1 byte |
| vDiskPacket | Disk packet for extended INT 13 functions | 26h | variable |

FIG. 4

HANDLING LEGACY BIOS SERVICES FOR MASS STORAGE DEVICES USING SYSTEMS MANAGEMENT INTERRUPTS WITH OR WITHOUT WAITING FOR DATA TRANSFERRED TO MASS STORAGE DEVICES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to input/output to storage devices.

BACKGROUND

Originally developed for IBM PC Compatible computers, the Basic Input/Output System (BIOS), also known as the System BIOS, is a de facto standard defining a firmware interface. The BIOS is boot firmware, designed to be the first code run by a PC when powered on. The initial function of the BIOS is to identify, test, and initialize system devices such as the video display card, hard disk, and floppy disk and other hardware. This is to prepare the machine into a known state, so that software such as an operating system stored on compatible media can be loaded, executed, and given control of the PC. This process is known as booting, or booting up, which is short for bootstrapping.

BIOS programs provide a small library of basic input/output functions that can be called to operate and control the peripherals such as the keyboard, text display functions and so forth. When a system is powered on, BIOS checks system configuration settings and loads interrupt handlers into memory addresses. Interrupt handlers are programs that act as translators between the hardware components and the operating system. For example, when a user presses a key on the keyboard, the signal is sent to the keyboard interrupt handler, which tells the processor what it is and passes it on to the operating system. Most interaction with mass storage devices in BIOS are handled using the INT13 interrupt handler. The INT instruction triggers a software interrupt. In response to the INT instruction, an interrupt handler is executed from a specified memory address; for example, the INT13 instruction causes an interrupt handler to be executed from a memory address, which is typically in the E0000h-FFFFFh region. The BIOS writes code for the interrupt handler for the INT13 instruction to the memory address in the E0000h-FFFFFh region during initial configuration of the system.

BIOS was developed for the IBM PC at a time when processors functioned in a 16-bit processor mode and addressable memory was limited to one megabyte, and the code reflected IBM PC AT hardware dependencies. Operating systems later developed for 32-bit processors began to include device drivers to handle I/O rather than rely on invoking the 16-bit runtime interface provided by BIOS. The Extensible Firmware Interface (EFI) is a specification that defines a software interface between an operating system and platform firmware. EFI defines boot services, which include text and graphical console support on various devices, bus, block, and file services, and runtime services, such as date, time, and NVRAM services. Interaction with mass storage devices in an EFI environment is handled through EFI device drivers.

Booting a system under either a traditional legacy operating system such as MS-DOS or under an EFI-aware operating system requires access to mass storage devices present in the system. During booting to a traditional legacy operating system, the access to mass storage devices has heretofore been supplied by INT13 interrupt handler code. During booting to an EFI-aware operating system, access to mass storage devices is supplied by the EFI drivers.

Since the target operating system is not known during the system firmware development, EFI firmware usually contains code to boot to both a legacy operating system using an INT13 interrupt handler and an EFI driver to boot to an EFI-aware operating system. The presence of code to implement both booting processes (INT13 handler and EFI drivers) in EFI firmware requires extra ROM space and additional space in runtime memory. Additionally, the presence of both methods (INT13 handler and EFI drivers) in EFI firmware may make the maintenance of the firmware difficult. Whenever new features need to be implemented in both the INT13 handler and the EFI drivers, the amount of work increases. In case of a problem with access to mass storage devices, additional work must be done to find whether the problem exists in both the INT13 handler and the EFI driver. A particular problem may need to be solved in both the INT13 handler and the EFI driver.

BRIEF DESCRIPTION OF THE DRAWINGS

FIG. 2A is a diagram showing an input/output (I/O) services handler for handling a request for input/output services in accordance with one embodiment of the invention.

FIG. 4 is an example data structure for communicating between components of the I/O services handler running inside and outside SMRAM in accordance with one embodiment of the invention.

DETAILED DESCRIPTION

Figure 1:
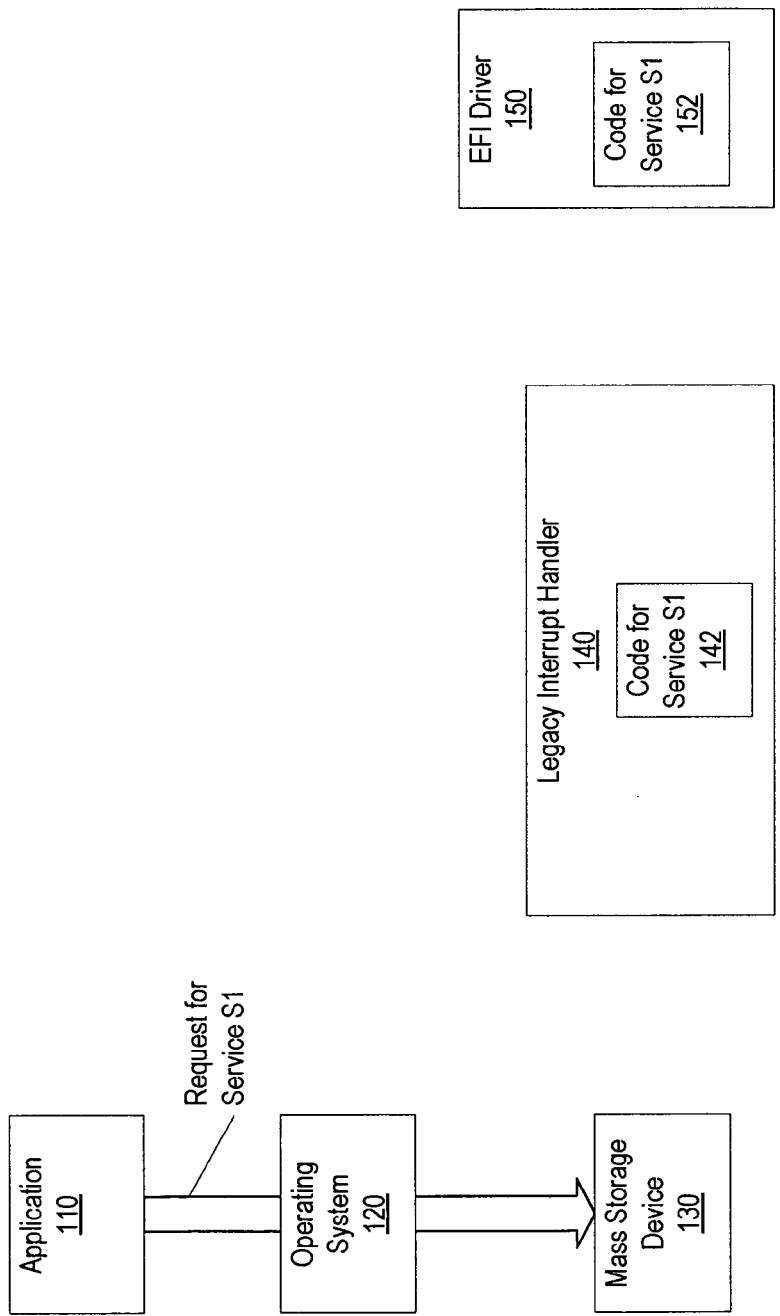
FIG. 1 is a diagram showing prior art components involved in handling a request for input/output services.

Embodiments of the present invention include a scheme to handle legacy BIOS input/output service requests. In response to receiving a request for an input/output service, a system management interrupt is generated to enter system management mode. A system management RAM (SMRAM) is accessible to code executing inside system management mode. Sub-operations to perform the requested service are identified, and code is executed outside the SMRAM to perform a sub-operation to fulfill the request. The sub-operations identified for execution outside SMRAM include any sub-operations that require waiting for data to be transferred. Other code executing inside the SMRAM may perform additional sub-operations that do not require waiting for data transfers to fulfill the request.

System management mode is exited before invoking the code to perform the sub-operation to execute outside the SMRAM. An execution status of the sub-operation is updated in a communication buffer, wherein the communication buffer is accessible to the code executing inside SMRAM and the code executing outside SMRAM. System management mode is re-entered by generating another system management interrupt after the code to perform the sub-operation has executed outside the SMRAM. The execution status of the sub-operation in the communication buffer is used to determine a status of the requested service and whether additional sub-operations are needed to fulfill the requested service.

In one embodiment, code to perform all sub-operations making up the requested service is included in an EFI driver, even though the service requested may be a legacy BIOS service that has traditionally been performed by executing an interrupt handler such as the INT13 interrupt handler.

An EFI environment includes a Compatibility Support Module (referred to herein as CSM) that enhances EFI with the capability to boot to a traditional legacy operating system, such as MS-DOS, using the legacy BIOS services. In general, the CSM contains several sub-modules, including a CSM32 sub-module that contains the 32-bit/64-bit code required in the EFI environment and the 32-bit/64-bit code of the communication interface between the CSM32 sub-module and a sub-module supporting legacy 16-bit environments. The CSM also includes a legacy environment CSM16 sub-module that contains the legacy BIOS runtime services/tables and the 16-bit code of the communication interface between the CSM32 sub-module and the CSM16 sub-module. The CSM also includes a mode-changing sub-module that changes the operating mode from 32-bit/64-bit EFI environment to a 16-bit environment and vice-versa. Legacy BIOS services, including INT13 services, are typically provided as part of the CSM16 sub-module.

An EFI-aware system requires the CSM to boot to a traditional operating system using the legacy BIOS services and may not require the CSM for booting to an EFI-aware operating system. During booting to a traditional legacy operating system, the access to mass storage devices has heretofore been supplied by INT13 handler code present in the CSM16 sub-module. During booting to an EFI-aware operating system, access to mass storage devices is supplied by the EFI drivers.

System Management Mode (SMM) is a mode of operation of a computer system first released with the Intel 386SL and available in later microprocessors in subsequent Intel architectures. In SMM, all normal execution (including the operating system) is suspended, and special separate software (usually firmware or a hardware-assisted debugger) is executed in high-privilege mode. SMM provides an isolated memory and execution environment, and SMM code is invisible to the operating system yet retains full access to host physical memory and complete control over peripheral hardware.

SMM is normally used to handle system events such as memory or chipset errors; to perform system safety functions, such as shutdown upon reaching a high CPU temperature; to perform power management operations, such as turning on fans; to configure the system; and to emulate hardware. Traditionally, SMM is entered to provide service to system management interrupts and then resumes program execution (back to the software stack including executive and application software). Code running in SMM has unrestricted access to system memory and peripheral devices, such as System Management Random Access Memory (SMRAM). For example, in Intel's Core i7 processor, a region of at least four megabytes of SMRAM is reserved for an enhanced debug SMM module.

Because entering SMM suspends normal execution of the operating system, the time that can be spent in SMM is limited by the operating system. Therefore, input/output operations to mass storage devices that involve data transfer operations may not complete within the limited time allowed to be spent in SMM. Consequently, most input/output operations are performed using either the legacy BIOS interrupt handlers or EFI device drivers rather than by entering SMM.

FIG. 1 is a diagram showing prior art components involved in handling a request for input/output services. An application 110 has made a request for an input/output particular service, which is referred to herein as "service S1." This request for service S1 may be, for example, a request to read data from or write data to mass storage device 130. Operating system 120 receives the request for service S1 from application 110 and translates the request into a call to appropriate code for service S1. For example, if operating system 120 is a traditional legacy operating system such as MS-DOS, operating system 120 causes code for a legacy interrupt handler 140 to be entered. The particular code for service S1 142 within the legacy interrupt handler 140 is then executed in response to the request for service S1.

In contrast, if operating system 120 is an EFI-aware operating system, then operating system 120 causes code for EFI driver 150 to be entered and executed instead. The particular code for service S1 152 within EFI driver 150 is executed in response to the request for service S1. Note that, as described above, the code to handle a particular request for service S1 is present in both legacy interrupt handler 140 and EFI driver 150, respectively as code for service S1 142 and code for service S1 152. This duplication of code to perform the same functionality causes the maintenance problems described above.

FIG. 2A is a diagram showing an I/O services handler for handling a request for input/output services in accordance with one embodiment of the invention. I/O services handler 270 includes a modified legacy interrupt handler 240, an EFI driver 250, and an SMI handler 260. Depending upon whether operating system 120 is a legacy operating system or an EFI-aware operating system, either modified legacy interrupt handler 240 or EFI driver 250 is invoked to handle an I/O service request. Modified legacy interrupt handler 240 is a revised version of legacy interrupt handler 140 of FIG. 1 with additional code to enable some sub-operations of the requested I/O service S1 to be performed inside SMRAM by SMI handler 260. Similarly, EFI driver 250 is a revised version of EFI driver 150 with additional code to enable some sub-operations of the requested I/O service S1 to be performed inside SMRAM by SMI handler 260.

In the embodiment shown in FIG. 2A, I/O services handler 270 is implemented so that modified legacy interrupt handler 240 and EFI driver 250 make use of EFI driver 250 code as much as possible. Consequently, SMI handler 260 SMRAM code 262 is written to be used by both EFI driver 250 as well as by modified legacy interrupt handler 240 to perform sub-operations inside SMRAM. Therefore, SMRAM code 262 provided by modified legacy interrupt handler 240 and SMRAM code 262 provided by EFI driver 250 are identical.

The SMRAM code 262 to be executed by SMI handler 260 is provided either by modified legacy interrupt handler 240 or by EFI driver 250. Modified legacy interrupt handler 240 will use SMRAM code 262 through System Management Interrupt (SMI) Handler 260 when running under a legacy operating system. EFI driver 250 will use SMRAM code 262 through System Management Interrupt (SMI) Handler 260 when running under an EFI-aware operating system.

Each of modified legacy interrupt handler 240 and EFI driver 250 also includes code to perform some sub-operations of the requested I/O service S1 outside SMRAM, respectively non-SMRAM code 242 and non-SMRAM code 252. Depending upon whether the I/O service is requested within a legacy or an EFI-aware operating system, either non-SMRAM code 242 or non-SMRAM code 252, executes to manage performance of the requested service from outside System Management Mode (SMM).

When running under a legacy operating system, in response to the request for service S1 by application 110, modified legacy interrupt handler 240 is invoked. An entry point for modified legacy interrupt handler 240 is provided in legacy system BIOS address space in the E0000h-FFFFFh region by the CSM16 sub-module of the CSM described above. Non-SMRAM Code 242 of modified legacy interrupt handler 240 is entered and executed. In one embodiment, Non-SMRAM code 242 of Modified legacy interrupt handler 240 manages the performance of service S1, such as identifying the particular service to be performed and tracking whether the service is performed successfully. Non-SMRAM code 242 generates a System Management Interrupt (SMI) to cause the system to enter System Management Mode (SMM), which causes System Management Interrupt Handler 260 to take control. In the embodiment shown, SMI handler 260 uses SMRAM code 262 as provided either by modified legacy interrupt handler 240 or by EFI driver 250.

When running under an EFI-aware operating system, in response to the request for service S1 by application 110, EFI driver 250 is invoked. Control is received by non-SMRAM code 252 usually above the 1 MB region of memory in 32 bit/64 bit mode. In one embodiment, Non-SMRAM code 252 of EFI driver 250 manages the performance of service S1, such as identifying the particular service to be performed and tracking whether the service is performed successfully. Non-SMRAM code 252 generates a System Management Interrupt (SMI) to cause the system to enter System Management Mode (SMM), which causes System Management Interrupt Handler 260 to take control. In the embodiment shown, SMI handler 260 uses SMRAM code 262 as provided either by modified legacy interrupt handler 240 or by EFI driver 250.

When the system is operating in SMM mode under the control of SMI handler 260, the status of service S1 is not accessible outside SMM. Therefore, the status of sub-operations performed in SMM must be tracked by separate code running within SMRAM and communicated to code running outside SMRAM, such as non-SMRAM code 242 of modified legacy interrupt handler 240 or non-SMRAM code 252 of EFI driver 250. Communication of information between code running inside SMRAM and code running outside SMRAM is described further below with reference to FIGS. 3 and 4.

Figure 2B:
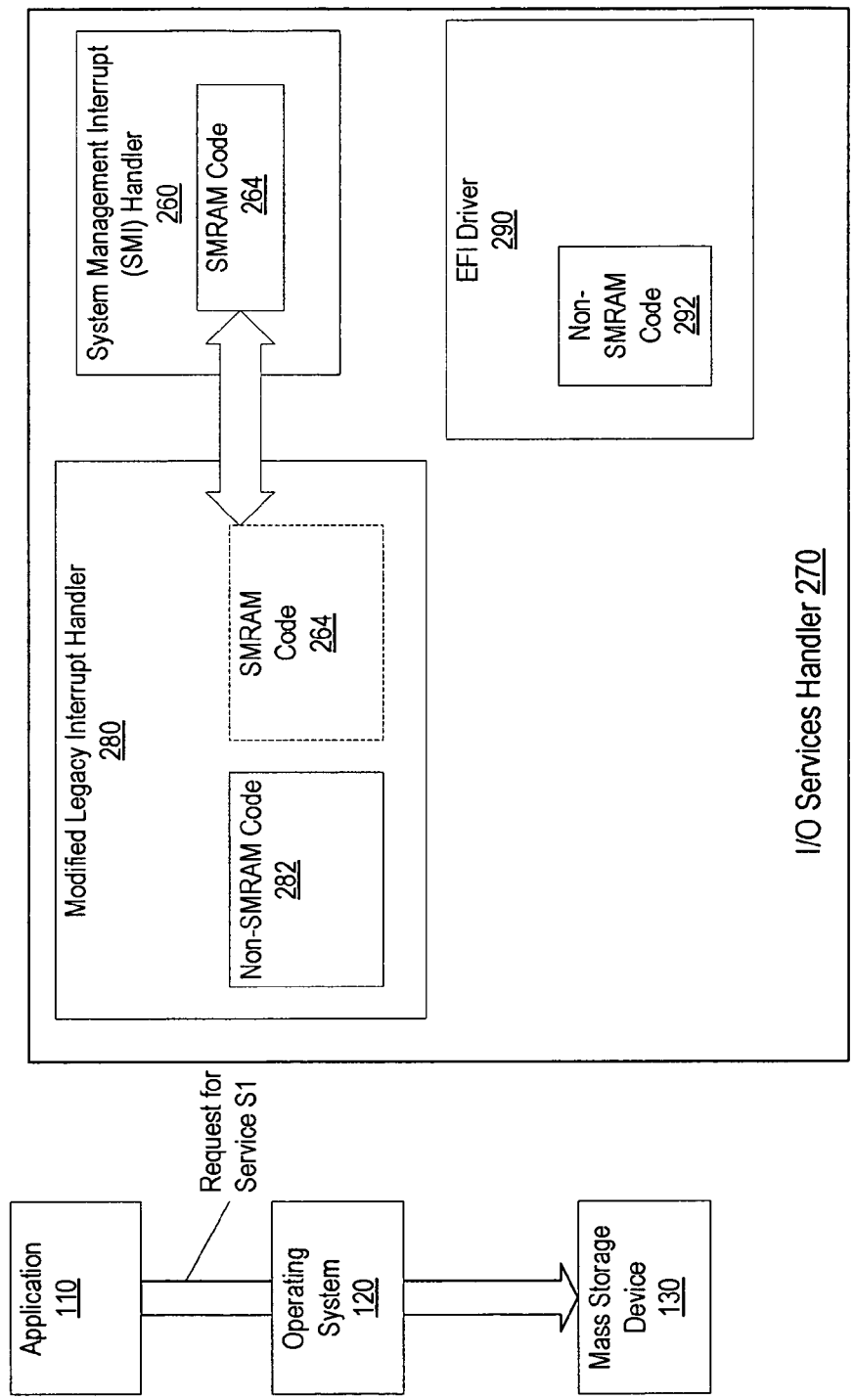
FIG. 2B is a diagram showing an input/output (I/O) services handler for handling a request for input/output services in accordance with another embodiment of the invention.

FIG. 2B is a diagram showing an I/O services handler for handling a request for input/output services in accordance with another embodiment of the invention. In this embodiment, EFI driver 290 is implemented to include only code running outside SMRAM, non-SMRAM code 292. However, EFI driver 290 non-SMRAM code 292 is written so that different functions can be called from other modules, including legacy modules running within SMRAM. Consequently, EFI driver 290 non-SMRAM code 292 is written to be used by both EFI driver 290 as well as by modified legacy interrupt handler 280 SMRAM code 264 to perform sub-operations inside SMRAM. Therefore, SMRAM code 264 of modified legacy interrupt handler 280 calls functions of EFI driver 290 non-SMRAM code 292.

Similar to the embodiment shown in FIG. 2A, modified legacy interrupt handler 280 and EFI driver 290 are implemented to use EFI driver 290 code (here non-SMRAM code 292) as much as possible. Non-SMRAM code 292 is written to be used by both EFI driver 290 as well as by modified legacy interrupt handler 280 SMRAM code 264 to perform sub-operations inside SMRAM when running in a legacy operating system environment.

When running under a legacy operating system, in response to the request for service S1 by application 110, modified legacy interrupt handler 280 is invoked. An entry point for modified legacy interrupt handler 280 is provided in legacy system BIOS address space in the E0000h-FFFFFh region by the CSM16 sub-module of the CSM described above. Non-SMRAM Code 282 of modified legacy interrupt handler 280 is entered and executed. In one embodiment, Non-SMRAM code 282 of modified legacy interrupt handler 280 manages the performance of service S1, such as identifying the particular service to be performed and tracking whether the service is performed successfully. Non-SMRAM code 282 generates a System Management Interrupt (SMI) to cause the system to enter System Management Mode (SMM), which causes System Management Interrupt Handler 260 to take control. In the embodiment shown, SMI handler 260 uses SMRAM code 264 as provided by modified legacy interrupt handler 280. In this embodiment, SMRAM code 264 is implemented to call functions of non-SMRAM code 292 of EFI driver 290.

When running under an EFI-aware operating system, in response to the request for service S1 by application 110, EFI driver 290 is invoked. Control is received by non-SMRAM code 292 usually above the 1 MB region of memory in 32 bit/64 bit mode. In one embodiment, Non-SMRAM code 292 of EFI driver 250 manages the performance of service S1, such as identifying the particular service to be performed and tracking whether the service is performed successfully. However, EFI driver 290 is implemented to perform all functions in non-SMRAM without entering System Management Mode (SMM).

Figure 3:
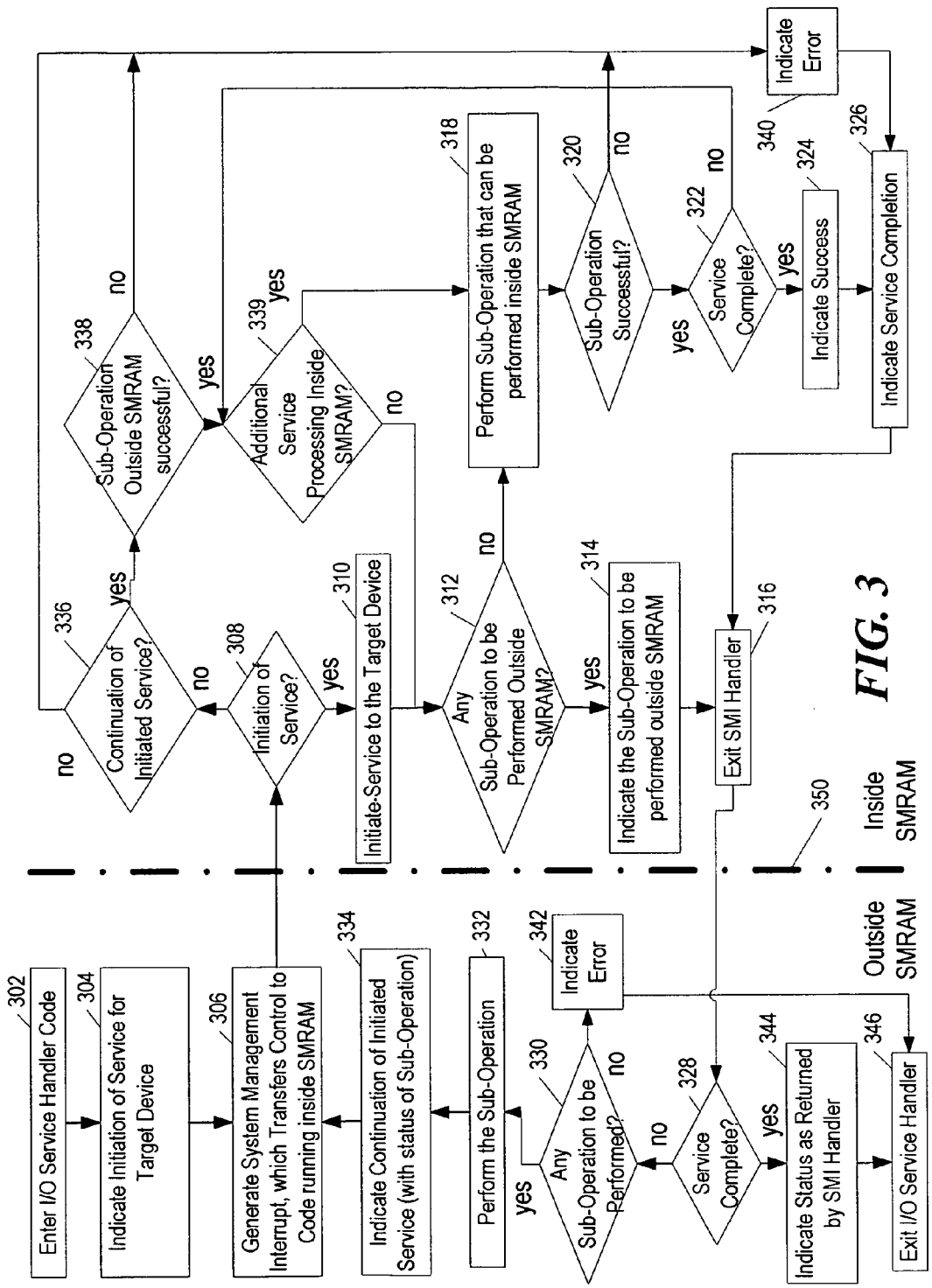
FIG. 3 shows a flowchart of a method for handling requests for input/output services in accordance with one embodiment of the invention.

FIG. 3 shows a flowchart of a method for handling requests for input/output services in accordance with one embodiment of the invention. In this embodiment, some steps of the method are performed by code running outside SMRAM, while other steps of the method are performed by code running inside SMRAM in response to a system management interrupt (SMI). The dotted line 350 separates code running outside SMRAM to the left of dotted line 350 from code running inside SMRAM on the right of dotted line 350. The method steps are described with reference to the modified legacy interrupt handler 240 non-SMRAM code 242 of FIG. 2 as one of the code modules running outside SMRAM and SMI handler 260 SMRAM code 262 as one of the code modules running inside SMRAM. However, this description is not intended to be limiting, and the method steps described as performed by modified legacy interrupt handler 240 non-SMRAM code 242 and SMI handler 260 SMRAM code 262 may be performed by one of the following alternatives: (1) EFI driver 250 non-SMRAM code 252 and SMI handler 260 SMRAM code 262 of FIG. 2A; (2) modified legacy interrupt handler 280 non-SMRAM code 282 and SMI handler 260 SMRAM code 264 (by calling functions of non-SMRAM code 292 of EFI driver 290) of FIG. 2B; or (3) EFI driver 290 and non-SMRAM code 292 of FIG. 2B.

In response to a request for input/output services, control proceeds to the entry point for code to handle the service request. In a traditional operating system such as MS-DOS, a request for input/output services would typically be provided by executing code for an interrupt handler, such as the INT13 handler. This entry point is typically at a memory address in the E0000h-FFFFFh region, which is outside SMRAM. However, rather than executing the traditional INT13 interrupt handler code at this entry point, code for modified legacy interrupt handler 240 in accordance with the present invention is executed from the memory address usually reserved for the INT13 interrupt handler. At "Enter I/O Service Handler Code" step 302, control passes to the entry point for code for the modified legacy interrupt handler 240.

At "Indicate Initiation of Service for Target Device" step 304, modified legacy interrupt handler 240 non-SMRAM code 242 performs management functions to track the performance of the requested service. In one embodiment, modified legacy interrupt handler 240 non-SMRAM code 242 sets up a data structure to serve as a communication buffer containing information about the requested service to communicate between non-SMRAM code 242 and SMI handler 260 SMRAM code 262. Information about the requested service and variables indicating parameters to be used in fulfilling the requested service may be initialized in the communication data structure when "Indicate Initiation of Service for Target Device" step 304 is performed. An example communication data structure is described in further detail below with reference to FIG. 4.

Examples of different types of input/output services include reading data from an Advanced Technology Attachment (ATA) hard disk, writing data to an ATA hard disk, or copying data from a source address to a destination address. If the requested service is to read data from an ATA hard disk, the service would be identified as a transfer of data from the target device to the host. If the requested service is to write data to an ATA hard disk, the service would be identified as a transfer of data from the host to the target device. If the requested service is to copy data from a source address to a destination address, the service would be identified as a transfer of data from the source address to the destination address.

From "Indicate Initiation of Service for Target Device" step 304, modified legacy interrupt handler 240 non-SMRAM code 242 transitions control to "Generate System Management Interrupt, which Transfers Control to Code Running Inside SMRAM" step 306. For example, generation of an SMI transitions control to System Management Interrupt Handler 260 of FIG. 2. SMI Handler 260 and SMRAM code 262 keep track of the status of all requested services from within System Management Mode (SMM). Upon entry into SMM in response to generation of the SMI in "Generate System Management Interrupt, which Transfers Control to Code Running Inside SMRAM" step 306, control transitions to "Initiation of Service" decision point 308. At "Initiation of Service" decision point 308, if the requested service is being initiated for the first time, control transitions to "Initiate Service to the Target Device" step 310. The communication buffer is updated to indicate that service has been initiated, with identifying information for the target device and for the requested service. For example, for a requested service of reading data from an ATA hard disk, initiating the service would involve sending the device-to-host data transfer command and other parameters to the target device. For a requested service of writing data to an ATA hard disk, initiating the service would involve sending the host-to-device data transfer command and other parameters to the device. For a requested service to copy data from a source address to a destination address, initiating the service would involve copying the requested amount of data from the source address to the destination address. After initiating service to the target device, control transitions to "Any Sub-Operation to be Performed Outside SMRAM?" decision point 312.

At "Any Sub-Operation to be Performed Outside SMRAM?" decision point 312, SMI handler 260 SMRAM code 262 may also identify sub-operations that are to be performed to complete the service. Depending on the nature of the target mass storage device, an access to the device may require different sub-operations in different stages and may require a large amount of time to complete the requested service. For example, the data transfer INT13 functions (read from the device and write to the device) require waiting for particular sub-operations to be completed. For example, reading or writing data require waiting for the data to ready to be read or written, waiting for an interrupt (IRQ) to be generated to indicate that the data are ready, and other similar sub-operations. If the entire data transfer process is executed under a single System Management Interrupt (SMI), the data transfer may consume more time than is allowed by the operating system, thereby violating the timing requirements of the operating system. Thus, SMI handler 260 SMRAM code 262 identifies sub-operations that will be required to perform the requested service and classifies the sub-operations to ensure that the SMI handler 260 consumes the minimum amount of time possible.

To reduce the time being spent in a single invocation of SMI handler 260, the requested input/output service is divided into number of sub-operations depending upon whether the sub-operation will require wait time. Sub-operations which do not involve any wait time will be executed inside SMRAM space by SMI handler 260 SMRAM code 262, and sub-operations which involve wait time will be executed outside SMRAM. Thus, depending on the number of sub-operations required to complete the requested service, a particular input/output service may require generation of multiple System Management Interrupts (SMIs). I/O services handler 270 uses a communication buffer between the non-SMRAM code 242 and the SMRAM code 262 to perform the requested input/output service using single or multiple SMIs ensuring that a minimum amount of time is consumed within SMI handler 260.

Sub-operations that are executed outside SMRAM space are implemented in the non-SMRAM code 242, which may include code supplied by the CSM16 image. Sub-operations executed inside SMRAM are implemented in SMI handler 260 SMRAM code 262. I/O services handler 270 uses a buffer to communicate between the code outside SMRAM and the code inside SMRAM.

At "Any Sub-Operation to be Performed Outside SMRAM?" decision point 312, if a sub-operation is to be performed outside SMRAM, control transitions to "Indicate the Sub-Operation to be Performed Outside SMRAM" step 314. The communication buffer is updated to indicate the sub-operation to be performed. For example, for a request to read data from an ATA hard disk, a wait-for-IRQ operation may be indicated to be performed outside SMRAM. For a request to write data to an ATA hard disk, both wait-for-DRQ sub-operations and wait-for-IRQ sub-operations may be indicated to be performed outside SMRAM. After "Indicate the Sub-Operation to be Performed outside SMRAM" step 314, control transitions to "Exit SMI Handler" step 316. When SMI handler 260 is exited, control returns to "Service Complete" decision point 328. Code to implement "Service Complete" decision point 328 resides in Non-SMRAM code 242 of modified legacy interrupt handler 240.

At "Any Sub-Operation to be Performed Outside SMRAM?" decision point 312, if no sub-operation is to be performed outside SMRAM, control transitions to "Perform Sub-Operation that can be Performed Inside SMRAM" step 318. For example, sub-operations that do not involve wait time should be able to be performed inside SMRAM without concern for whether the operating system's timing requirements may be violated. An example of a request for service that has no sub-operations to be performed outside SMRAM is an INT15 request to copy data from a source address to a destination address. Control then transitions to "Sub-Operation Successful?" decision point 320. If the sub-operation is successful at "Sub-Operation Successful?" decision point 320, control transitions to "Service Complete?" decision point 322, where a determination is made whether the service has been completed.

If the service is complete at "Service Complete?" decision point 322, control transitions to "Indicate Success" step 324, where the requested status of the service is recorded as successful. For example, a status for the requested service may be recorded as successful in the communication buffer. If the service is not complete at "Service Complete?" decision point 322, control returns to "Additional Service Processing Inside SMRAM?" decision point 339, where processing continues as described above. For example, for a read service, if more data are being read than can be held in an internal buffer, another sub-operation to transfer data may be required to fulfill the read service request.

At "Sub-Operation Successful?" decision point 320, if the sub-operation is not successful, control transitions to "Indicate Error" step 340, where the communication buffer is updated to indicate that the sub-operation was not successful. Control then continues to "Indicate Service Completion" step 326 and to "Exit SMI Handler" step 316, where SMI handler 260 is exited and the system returns from System Management Mode. Control then returns to "Service Complete?" decision point 328.

At "Service Complete?" decision point 328, control has returned from System Management Mode (SMM) to code running outside SMRAM, such as non-SMRAM code 242 of modified legacy interrupt handler 240. If the requested service is not yet completed at "Service Complete?" decision point 328, control transitions to "Any Sub-Operation to be Performed?" decision point 330. Control has transitioned to this point if any sub-operations that involve wait time are included in the requested service. For example, for a request to read data from an ATA hard disk, a wait-for-IRQ (interrupt request) sub-operation may be outstanding. Alternatively, a request to read data from a device configured for polling may be waiting on a response to a poll operation to see if the data are available. For a request to write data to an ATA hard disk, a wait-for-DRQ (data request) sub-operation, where the device indicates its readiness to receive the data to be written, may be outstanding.

If sub-operations are to be performed outside SMRAM to complete the requested service, control transitions from "Any Sub-Operation to be Performed?" decision point 330 to "Perform the Sub-Operation" step 332. The sub-operation, which requires wait time or else it would have been performed when the system was in System Management Mode (SMM), can be performed without concern for whether operating system timing requirements for processing SMIs has been exceeded. When the sub-operation is performed, control transitions from "Perform the Sub-Operation" step 332 to "Indicate Continuation of Initiated Service (with status of Sub-Operation)" step 334. The status of the sub-operation performed outside SMRAM is provided in the communication buffer, along with an indication that the requested service is the continuation of a previously-initiated service. Control then returns to "Generate System Management Interrupt, which Transfers Control to Code Running Inside SMRAM" step 306 to generate another SMI to re-enter System Management Mode (SMM) and continue processing the requested service. Control proceeds from "Generate System Management Interrupt, which Transfers Control to Code Running Inside SMRAM" step 306 as described above.

At "Any Sub-Operation to be Performed?" decision point 330, control has transitioned to this point if any sub-operations that involve wait time are included in the requested service. If no sub-operations remain to be performed to complete the requested service at decision point 330, an error has occurred because the service is not yet complete and no sub-operations remain to be performed. Control transitions to "Indicate Error" step 342 and then to "Exit I/O Service Handler" step 346. An error status can be returned to the application requesting service.

At "Service Complete" decision point 328, control has returned from System Management Mode (SMM) to code running outside SMRAM, such as non-SMRAM code 242 of modified legacy interrupt handler 240. At "Service Complete?" decision point 328, if the requested service is completed, control transitions to "Indicate Status as Returned by SMI Handler" step 344. A status indicating whether the requested service was performed successfully is finalized in the communication buffer. Control then proceeds to "Exit I/O Service Handler" step 346, where a status indicating whether the requested service was performed successfully is returned to the requesting application program, such as application 110 of FIG. 2.

The following paragraphs continue the discussion of processing of a requested service within System Management Mode (SMM). At "Initiation of Service" decision point 308, if the requested service is not being initiated for the first time, but instead is a continuation of a previously-initiated service, control transitions to "Continuation of Initiated Service" decision point 336. If SMI handler 260 was invoked with the communication buffer indicating continuation of a previously-initiated service, control transitions to "Sub-Operation Outside SMRAM successful?" decision point 338. If the communication buffer indicates that the sub-operation performed outside SMRAM was successful, control transitions to "Additional Service Processing Inside SMRAM?" decision point 339. For example, if the requested service involves a data transfer operation, the completion of a sub-operation such as a wait-for-IRQ sub-operation may require additional processing inside SMRAM.

For example, for a read operation to an ATA disk, after a read command has been sent to the device, the host waits for an interrupt from the device indicating that the data are available for the host to read. If additional data must be read to complete the data transfer for the read command, an iterative series of interrupts indicating that data are available to be read may be required to complete the read service request. If a wait-for-IRQ operation is successful at "Sub-Operation Outside SMRAM Successful?" decision point 338, additional processing may be needed inside SMRAM, and control transitions from "Additional Service Processing Inside SMRAM" decision point 339 to "Perform Sub-Operation that can be Performed Inside SMRAM" step 318. Control proceeds from "Perform Sub-Operation that can be Performed Inside SMRAM" step 318 as described above.

For example, after determining that a wait-for-IRQ operation is successful at "Sub-Operation Outside SMRAM Successful?" decision point 338, additional processing inside SMRAM may be needed to complete a read operation for the ATA disk. These sub-operations may include analyzing a status of the device, and if the device indicates a successful status, then another SMRAM sub-operation may be performed to transfer the available data from the device to a buffer. This buffer may be supplied by the application when the application requests the data transfer service. In one embodiment, the buffer supplied by the application may be used directly; in another embodiment, an internal buffer may be used for data transfer and data may be copied from the internal buffer to the buffer supplied by the application before the data transfer operation is considered complete.

After the available data are transferred inside SMRAM, as each sub-operation is performed, control transitions to "Sub-Operation Successful?" decision point 320 and, if successful, to "Service Complete?" decision point 322. At "Service Complete?" decision point 322, if all requested data has not been transferred to complete the read operation for the ATA disk, control returns to "Additional Service Processing Inside SMRAM" decision point 339. If no sub-operations remain to be performed inside SMRAM, control transitions to "Any Sub-Operation to be Performed Outside SMRAM?" decision point 312. In this way, iterative wait-for-IRQ sub-operations may be generated during the process of transferring (reading) all of the available data from the device before the requested read service can be considered to be complete.

Similarly, for a write operation to an ATA disk, two types of sub-operations to be performed outside SMRAM may be involved, both a wait-for-DRQ sub-operation signaling that the device is ready to receive the data to be written and a wait-for-IRQ sub-operation from the device indicating that the data have been written to the device. The wait-for-IRQ sub-operation for a write service will be handled similarly to the wait-for-IRQ sub-operation for a read service, as described above. As with a read service, when a wait-for-IRQ sub-operation has completed successfully, a check is performed at "Service Complete" decision point 322 to determine whether all of the data have been written to fulfill the write service. If not, control returns to "Additional Service Processing Inside SMRAM" decision point 339 to enable additional data to be transferred to the device within SMRAM.

The handling of a wait-for-DRQ sub-operation indicating that a device is ready to receive data to be written is described below. If a wait-for-DRQ operation is successful at "Sub-Operation Outside SMRAM Successful?" decision point 338, additional processing may be required within SMRAM. Control would transition from "Additional Service Processing Inside SMRAM?" decision point 339 to "Perform Sub-Operation that can be Performed Inside SMRAM" step 318. For example, sub-operations that may be performed inside SMRAM include writing the available data to the device. When all available data have been written to the device, a wait-for-IRQ sub-operation is generated to be performed outside SMRAM in order to complete the write service.

At "Additional Service Processing Inside SMRAM?" decision point 339, if no additional processing is needed inside SMRAM, control proceeds to "Any. Sub-Operation to be Performed Outside SMRAM?" decision point 312 to determine whether any additional sub-operations remain to be performed outside SMRAM. From "Any Sub-Operation to be Performed Outside SMRAM?" decision point 312, control continues as described above.

At "Continuation of Initiated Service" decision point 336, if SMI handler 260 was not invoked with the communication buffer indicating continuation of a previously-initiated service, control transitions to "Indicate Error" step 340. An error in performance of the requested service has occurred, and the communication buffer is updated to indicate that neither initiation of service or continuation of a previously-initiated service has been requested. Control then proceeds to "Indicate Service Completion" step 326, where processing of the requested service is completed, and then to "Exit SMI Handler" step 316, where SMI handler 260 code is exited and the system returns from System Management Mode (SMM).

FIG. 4 is an example data structure for communicating between code running inside and outside SMRAM in accordance with one embodiment of the invention. The following discussion will be described in the context of I/O services handler 270 components modified legacy interrupt handler 240 non-SMRAM code 242 which communicates with SMI handler 260 SMRAM code 262, although the invention is not limited to such an implementation of I/O services handler 270. These code modules communicate with each other via a data structure such as communication buffer 410. In one embodiment, the non-SMRAM code 242 creates and initializes the data structure. Both non-SMRAM code 242 and SMRAM code 262 use and update the information contained in communication buffer 410. In accordance with the INT13 specification, information such as the target device, the requested service, and the data buffer are provided in respective registers associated with the INT13 interrupt handler. The industry standard INT13 specification can be found at the URL http:##www.t13.org (where the '/' character in the URL has been replaced with the '#' character to avoid an active link from within this document.) The document "BIOS Enhanced Disk Drive Services-3 (EDD-3)" which describes the INT13 specification can be downloaded from the URL http:##www.t13.org#Documents#UploadedDocuments#docs 2004#d1572r3-EDD3.pdf (where the '/' character in the URL has been replaced with the '#' character to avoid an active link from within this document.)

In the embodiment of communication buffer 410 shown in FIG. 4, field dSignature 412 contains a signature indicating the direction of information flow. The contents of field dSignature 412 can be checked by the respective code for validation purposes before using the information. In one embodiment, an ASCII string "$I13" is used to indicate the information flow from the code outside SMRAM (non-SMRAM code 242) to the code inside SMRAM (SMRAM code 262). Offset-0 contains the character '$', offset-1 contains the character 'I', offset-2 contains the character '1', and offset-3 contains the character '3'. Field dSignature 412 is filled with signature "$I13" by the code outside SMRAM, non-SMRAM code 242, before generating an SMI to enter System Management Mode (SMM). For information flowing in the opposite direction from SMRAM code 262 to non-SMRAM code 242, an ASCII string "$S13" is used. Offset-0 contains the character '$', offset-1 contains the character 'S', offset-2 contains the character '1', and offset-3 contains the character '3'. This field is filled with signature "$S13" by the code inside SMRAM. SMRAM code 262, before exiting the SMI handler 260.

Fields dEAX 414, dEBX 416, dECX 418, dEDX 420, dESI 422, dEDI 424, dEBP 426, wDS 428, wES 430 contain the value of the respective registers with which an INT13 interrupt handler is invoked. These fields are filled by the code outside SMRAM, non-SMRAM code 242, before generating the SMI. If the requested service has output in registers, the respective fields (corresponding to the registers that have output) are updated by the code inside SMRAM, SMRAM code 262, before exiting the SMI handler. For example, for the INT13 function 08h, which returns the device geometry, register DH returns the maximum head number of the device, bits 5-0 of register CL return the maximum sector number, and so on.

Field bReturnStatus 432 contains the status of the current sub-operation performed inside SMRAM. If the sub-operation is complete, then this field represents the final status to be returned in register AH by the INT13 handler. This field is filled by the code inside SMRAM, SMRAM code 262. In one embodiment, bReturnStatus 432 provides detailed status for the sub-operation.

Field bExeState 434 contains the bit-mapped information representing the different states of the execution of various sub-operations included in the service. This field is filled by both the code outside SMRAM, non-SMRAM code 242, and the code inside SMRAM, SMRAM code 262. In one embodiment, the following bit field values are used to indicate the status of an input/output operation for an Advanced Technology Attachment (ATA) hard disk:

| Bit | Value | Meaning |
|---|---|---|
| 0 | 0 | Continuation of the requested Service |
| 0 | 1 | Initiation of the requested Service |
| 1 | 0 | Do not perform Wait-for-IRQ sub-operation outside SMRAM |
| 1 | 1 | Perform Wait-for-IRQ sub-operation outside SMRAM |
| 2 | 0 | Do not perform Wait-for-DRQ sub-operation outside SMRAM |
| 2 | 1 | Perform Wait-for-DRQ sub-operation outside SMRAM |
| 3 | — | Reserved |
| 4 | 0 | Service not yet complete |
| 4 | 1 | Completion of Service |
| 5 | 0 | Wait for IRQ sub-operation performed outside SMRAM status: IRQ did not happen (therefore sub-operation unsuccessful) |
| 5 | 1 | Wait-for-IRQ sub-operation performed outside SMRAM: IRQ happened (therefore sub-operation successful) |
| 6 | 0 | Wait-for-DRQ sub-operation performed outside SMRAM: DRQ did not happen (therefore sub-operation unsuccessful) |
| 6 | 1 | Wait-for-DRQ sub-operation performed outside SMRAM: 1, DRQ happened (therefore sub-operation successful) |
| 7 | — | Reserved |

In one embodiment, field bExeState field 434 indicates general information about whether a sub-operation was successful and field bReturnStatus 432 is used to provide more detailed status information for individual sub-operations.

Field vDiskPacket 436 may be used to contain information supplied in a disk packet during generation of an interrupt for extended INT13 functions (e.g. INT13 Function 42h, INT13 Function 43h, etc.).

A data structure such as communication buffer 410 contains valid information during execution of a requested input/output service and hence can be allocated dynamically as and when required. In one embodiment, the code outside SMRAM, non-SMRAM code 242, provides the physical address of communication buffer 410 to the code inside SMRAM, SMRAM code 262.

As an example of the method in performing a requested service, assume that an application program has requested to perform a device-to-host data transfer (i.e. read from ATA Hard Disk) using INT13 Function 02h (Read Sectors function) to read 40h sectors from Cylinder number 00h, Head number 00h, Sector number 01h of Drive number 80h at memory address 3000:8000h. The registers which are valid at the INT13 entry point and their content for this particular INT13 service are register AX=0240h (AH=Function number 02h, AL=40h, number of sectors to read); register CX=0001h (CH=Bit7-0 of 10-bit Cylinder number 00h, Bit7-6 of CL=Bit9-8 of 10-bit Cylinder number 00h, Bit5-0 of CL=Sector number 01h); register DX=0080h (DH=Head number 00h, DL=Drive number 80h); register BX=8000h (Offset of buffer where data will be read); and register ES=3000h (Segment of buffer where data will be read). Note that the other registers, namely, Bit31-16 of EAX, Bit31-16 of EBX, Bit31-16 of ECX, Bit31-16 of EDX, ESI, EDI, EBP, and DS do not contain any information for INT13 Function 02h and are assumed to be zero for the illustration. These values may be initialized in communication buffer 410 as described with reference to "Indicate Initiation of Service for Target Device" step 304 of FIG. 3.

The output from INT13 Function 02h as defined by the Industry Standard INT13 specification is as follows: Carry Flag=0, Successful and buffer contains the data read from the hard disk; Carry Flag=1, Error and buffer content is undefined. The status contained in Register AH=Status=00 to indicate successful status and not equal to 00 to indicate an error condition. The final status of the request for service will be indicated at "Indicate Status as Returned by SMI Handler" step 344 of FIG. 3.

During execution of the method steps of FIG. 3 in performing this requested service, at "Initiate Service to the Target Device" step 308, the field bExeState field 434 of communication buffer 410 would be initialized to have a value of 01h (Bit-0=1) indicating the initiation of the requested service. The field dSignature 412 would be initialized with an ASCII string "$I13" indicating the information flow from the code outside SMRAM, non-SMRAM code 242, to the code inside SMRAM, SMRAM code 262.

At this point in execution of "Initiate Service to the Target Device" step 308, the contents of communication buffer 410 would appear as follows:

| Field Name | Content |
|---|---|
| dSignature | Signature ASCII string "$I13" indicating the information flow from the code outside SMRAM to the code inside SMRAM |
| dEAX | 00000240h |
| dEBX | 00008000h |
| dECX | 00000001h |
| dEDX | 00000080h |
| dESI | 00000000h |
| dEDI | 00000000h |
| dEBP | 00000000h |
| wDS | 0000h |
| Wes | 3000h |
| bReturnStatus | FFh indicating a non-zero value |
| bExeState | 01h indicating Initiation of Service (Bit-0 = 1) |
| vDiskPacket | Not required for this service (initialized to FFh) Since the INT13 Function 02h is not an extended INT13 function, this field is not required for the requested service. |

While the requested service is being performed, it is likely that several wait-for-IRQ sub-operations will be initiated to wait as data are read from the target device. These sub-operations would be performed outside SMRAM by non-SMRAM code 242 as described with reference to "Perform the Sub-Operation" step 332 of FIG. 3. As each wait-for-IRQ sub-operation is performed, at "Indicate Continuation of Initiated Service (with status of Sub-Operation)" step 334, continuation of service may be indicated by setting Bit-0 to 0 in bExeState field 434 in communication buffer 410. If the Wait-for-IRQ sub-operation is successful, (Bit-5 of bExeState field 434 is 1), then the status of the sub-operation will be set to successful. When control proceeds to "Additional Service Processing Inside SMRAM?" decision point 339 of FIG. 3, control transitions to "Perform Sub-Operation that can be Performed Inside SMRAM" step 318. These sub-operations may include analyzing the target device status, and if the target device status is successful, the available data are read from the device and stored in a buffer. If all requested amount of data is not yet transferred (i.e. some more data is yet to be read), the field bExeState 434 can be set with bit-4=0 to indicate that service is not yet complete and bit-1=1 to indicate that a wait-for-IRQ sub-operation remains to be performed outside SMRAM at "Indicate the Sub-Operation to be performed outside SMRAM" step 314.

Otherwise, if the data transfer completed successfully, the field bReturnStatus 432 can be set to with 00h indicating that the requested service was completed successfully. In this scenario, bExeState field 434 in communication buffer 410 would be set to a value of 10h (Bit-4=1) indicating the completion of requested service at "Indicate Service Completion" step 326. At "Exit SMI Handler" step 316, dSignature field 412 would be set to ASCII string "$S13" indicating the information flow from the code inside SMRAM to the code outside SMRAM.

At "Indicate Service Completion" step 326, communication buffer 410 appears as follows:

| Field Name | Content |
| --- | --- |
| dSignature | Signature ASCII string "$S13" indicating the information flow from the code inside SMRAM to the code outside SMRAM |
| dEAX | 00000240h |
| dEBX | 00008000h |
| dECX | 00000001h |
| dEDX | 00000080h |
| dESI | 00000000h |
| dEDI | 00000000h |
| dEBP | 00000000h |
| wDS | 0000h |
| wES | 3000h |
| bReturnStatus | 00h indicating current operation inside SMRAM is successful |
| bExeState | 10h indicating Completion of Service (Bit-4 = 1) |
| vDiskPacket | Not required for this service (initialized to FFh) |

If, however, the read operation is not successful due to failure of a wait-for-IRQ sub-operation, Bit-5 of bExeState field 434 would be set to 0. This is an Error situation. The bReturnStatus field 432 in communication buffer 410 would be set with an error code for time out (which is 80h) indicating current status is not successful. Upon exiting SMI handler at "Exit SMI Handler" step 316, the contents of communication buffer 410 would be as follows:

| Field Name | Content |
| --- | --- |
| dSignature | Signature ASCII string "$S13" indicating the information flow from the code inside SMRAM to the code outside SMRAM |
| dEAX | 00000240h |
| dEBX | 00008000h |
| dECX | 00000001h |
| dEDX | 00000080h |
| dESI | 00000000h |
| dEDI | 00000000h |
| dEBP | 00000000h |
| wDS | 0000h |
| wES | 3000h |
| bReturnStatus | Non-Zero Error Code indicating current status is not successful |
| bExeState | 10h indicating Completion of Service (Bit-4 = 1) |
| vDiskPacket | Not required for this service (initialized to FFh) |

At "Indicate Status as Returned by SMI Handler" step 344, the registers would be initialized with the values from the corresponding fields in communication buffer 410. For example, the register ECX would receive its value from the dECX field 418 of communication buffer 410, register EDX would receive its value from dEDX field 420, register DS from wDS field 428, and so on. The value from bReturnStatus field 432 in communication buffer 410 would be placed into register AH so that register AH contains the final status of the requested INT13 service. If bReturnStatus field 432 has a value of 0, the Carry Flag will be set to have a value of 0, indicating that the INT13 Function 02h is successful. Otherwise, if the bReturnStatus field 432 has a value that is not equal to zero, the Carry Flag will be set to have a value of 1, indicating that the requested INT13 Function 02h is not successful.

At "Service Complete?" decision point 328, if the service is not complete, and a sub-operation such as a wait-for-IRQ sub-operation is pending, Bit-4 of bExeState field 434 would be set to 0 to indicate that the service is incomplete in communication buffer 410. If a Wait-for-IRQ sub-operation is pending, Bit-1 of bExeState field 434 would be set to 1. At "Perform the Sub-Operation" step 332, non-SMRAM code 242 would wait for the IRQ to happen. At "Indicate Continuation of Initiated Service (with status of Sub-Operation)" step 334, if the IRQ happens, bExeState field 434 in communication buffer 410 would be set to contain a value of 20h, indicating continuation of service (Bit-0=0) and IRQ happened (Bit-5=1). If the IRQ does not happen (after a timeout period expires, for example), bExeState field 434 in communication buffer 410 would be set to contain a value of 00h, indicating continuation of service (Bit-0=0) and IRQ did not happen (Bit-5=0). The dSignature field 412 in communication buffer 410 would be filled with ASCII string "$I13" indicating the information flow from the code outside SMRAM to the code inside SMRAM.

At "Indicate Continuation of Initiated Service (with status of Sub-Operation)" step 334, the contents of communication buffer 410 would appear as follows:

| Field Name | Content |
| --- | --- |
| dSignature | Signature ASCII string "$I13" indicating the information flow from the code outside SMRAM to the code inside SMRAM |
| dEAX | 00000240h |
| dEBX | 00008000h |
| dECX | 00000001h |
| dEDX | 00000080h |
| dESI | 00000000h |
| dEDI | 00000000h |
| dEBP | 00000000h |
| wDS | 0000h |
| wES | 3000h |
| bReturnStatus | 00h |
| bExeState | 20h if IRQ happened (Bit-5 = 1) indicating Continuation of Service (Bit-0 = 0) 00h if IRQ did not happen (Bit-5 = 0) indicating Continuation of Service (Bit-0 = 0) |
| vDiskPacket | Not required for this service (initialized to FFh) |

Control would then proceed to "Generate System Management Interrupt, which Transfers Control to Code Running Inside SMRAM" step 306, and SMM would be entered. The continuation of the service would then be processed in accordance with values in the communication buffer 410.

The I/O services handler of the present invention reduces the amount of required space to store code for handling input/output services both in ROM and in runtime memory. By reducing the amount of runtime memory required for input/output services, equipment manufacturers can use the free runtime memory for their own purposes. The same code can be used to initialize storage devices whether a system is booting under a traditional legacy operating system such as MS-DOS or an EFI-aware operating system. By enabling the same code to be used in both scenarios, maintenance of the code is easier. The I/O services handler of the present invention ensures that minimum time is being spent within a particular SMI handler and that stringent timing requirements of the operating system are met. Data transfer operations can be optimized for devices that are either interrupt-driven or accessed by polling. All types of mass storage devices can be supported by the I/O services handler of the present invention, which is compatible with existing as well as future operating environments.

Figure 5:
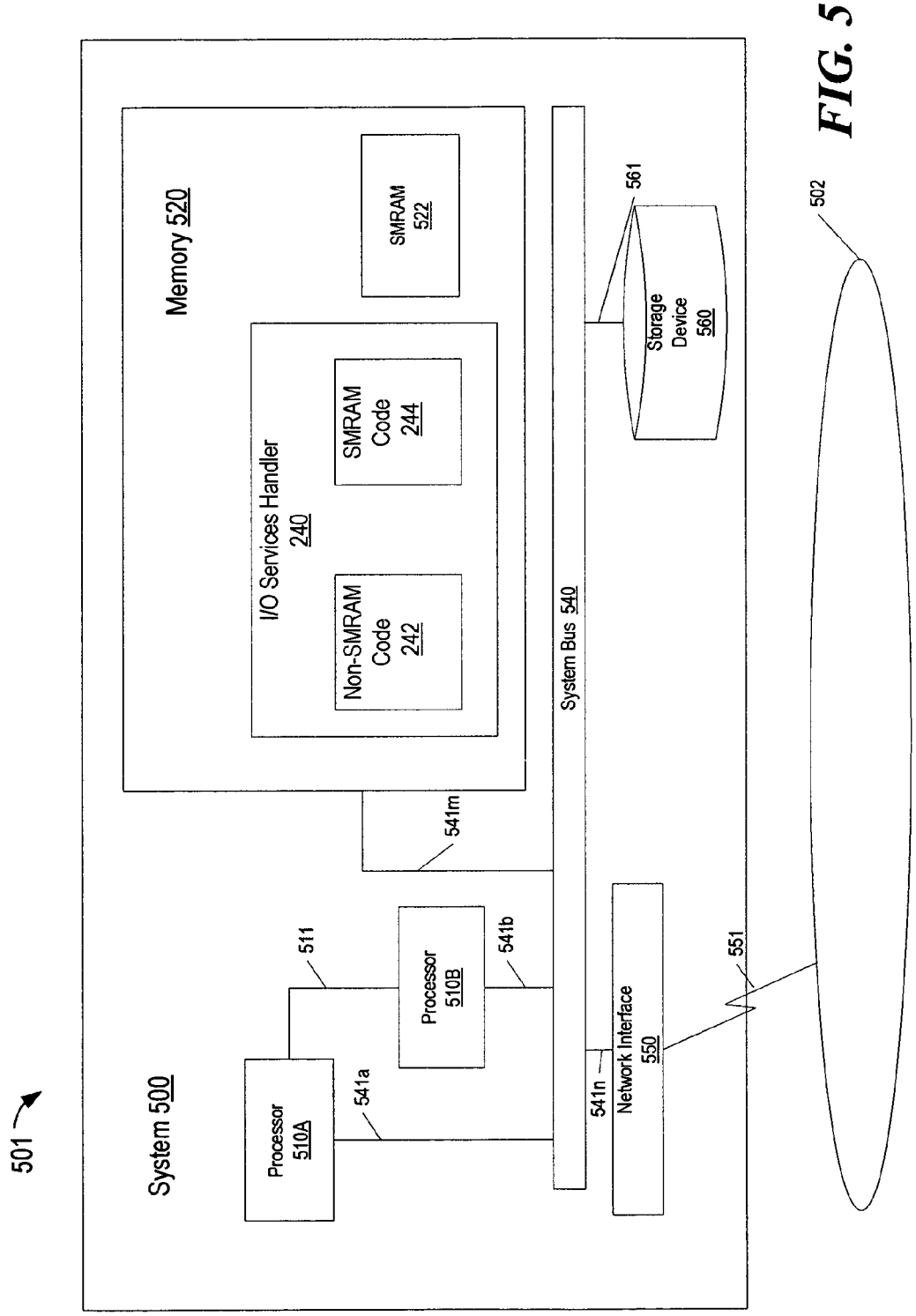
FIG. 5 is a block diagram depicting a suitable data processing environment in which certain aspects of an example embodiment of the present invention may be implemented.

FIG. 5 is a block diagram depicting a suitable data processing environment 501 in which certain aspects of an example embodiment of the present invention may be implemented. Data processing environment 501 includes a processing system 500 that includes one or more processors or central processing units (CPUs), shown here as processors 510A and 510B. One of skill in the art will recognize that, while two processors are shown, a single processor or any number of multiple processors may provide processor functionality to processing system 500. Each of processors 510A and 510B may be a single-core or a multi-core processor. Processors 510A and 510B are shown as communicatively coupled to various other components including a memory 520 and a storage device 560 via one or more system buses 540 or other communication pathways or mediums. Processors 510A and 510B are also shown as connected via a point-to-point processor interconnection 511, such as a HyperTransport link or an Intel QuickPath Interconnect (QPI).

An I/O services handler 270 may be implemented as instructions executed by processor 510A and/or processor 510B within memory 520. Non-SMRAM code such as modified legacy interrupt handler 240 non-SMRAM code 242 may execute within memory 520, and SMRAM code such as SMI handler 260 SMRAM code 262 may execute within SMRAM 522.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Processing system 500 may be controlled, at least in part, by input from conventional input devices, such as keyboards, mice, etc., and/or by commands received from another machine, biometric feedback, or other input sources or signals. Processing system 500 may utilize one or more connections to one or more remote data processing systems (not shown), such as through a network interface controller (NIC) 550, a modem, or other communication ports or couplings.

Processing system 500 may be interconnected to other processing systems (not shown) by way of a physical and/or logical network 502, such as a local area network (LAN), a wide area network (WAN), an intranet, the Internet, etc. Communications involving network 502 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Within processing system 500, processors 510A and 510B may be communicatively coupled to one or more volatile or non-volatile data storage devices, such as memory 520 and storage device 560. Processors 510A and 510B are connected to memory 520 via system bus 540 and interconnections 541a, 541b, and 541m. Processors 510A and 510B are connected to storage device 560 via system bus 540 and interconnection 561. Memory 520 may include random access memory (RAM) and read-only memory (ROM) and includes System Management RAM (SMRAM) 522, which is accessible when system 500 is running in System Management Mode (SMM). For purposes of this disclosure, the term "ROM" may be used in general to refer to non-volatile memory devices such as erasable programmable ROM (EPROM), electrically erasable programmable ROM (EEPROM), flash ROM, flash memory, etc. Storage device 560 may include mass storage devices such as integrated drive electronics (IDE) hard drives, Serial ATA (SATA) drives, SCSI drives, CDROM/DVD drives, USB drives, and/or other devices or media, such as floppy disks, optical storage, tapes, flash memory, memory sticks, digital video disks, biological storage, etc. Processors 510A and 510B may also be communicatively coupled to additional components, such as video controllers, small computer system interface (SCSI) controllers, network controllers, universal serial bus (USB) controllers, input devices such as a keyboard and mouse, etc. Processing system 500 may also include one or more bridges or hubs, such as a memory controller hub, an input/output (I/O) controller hub, a PCI root bridge, etc., for communicatively coupling various system components. As used herein, the term "bus" may be used to refer to shared communication pathways, as well as point-to-point pathways. System bus 540 also provides access to a network interface 550 via interconnection 541n.

Some components, such as a NIC for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for handling input/output services for mass storage devices using system management interrupts. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A method performed by a handler executed by a processor, the method comprising:
receiving a request for an input/output service;
generating in response to the request a system management interrupt to enter a system management mode, wherein a system management random access memory (SMRAM) coupled to the processor is accessible only to first code executing inside the SMRAM;
causing second code to execute outside the SMRAM to perform a sub-operation that requires waiting for data to be transferred with a mass storage device to fulfill the request; and
causing the first code executing inside the SMRAM to perform a second sub-operation that does not require waiting for data to be transferred with the mass storage device to fulfill the request.

2. The method of claim 1 further comprising:
exiting system management mode before causing the second code to execute outside the SMRAM.

3. The method of claim 1 further comprising:
updating an execution status of the sub-operation in a communication buffer, wherein the communication buffer is accessible to the first code and the second code.

4. The method of claim 3 further comprising:
re-entering system management mode after the second code has executed outside the SMRAM; and
using the execution status of the sub-operation in the communication buffer to determine a status of the requested service.

5. The method of claim 1 wherein
the request for the input/output service is a request for a legacy basic input/output service (BIOS) service.

6. The method of claim 1 wherein
the first code is a first portion of an extensible firmware interface (EFI) driver.

7. A system comprising:
at least one processor; and
a memory comprising instructions for a handler executing on the processor to perform the following:
receive a request for an input/output service;
generate in response to the request a system management interrupt to enter a system management mode, wherein a system management random access memory (SMRAM) coupled to the processor is accessible only to first code executing inside the SMRAM;
cause second code to execute outside the SMRAM to perform a sub-operation that requires waiting for data to be transferred with a mass storage device to fulfill the request; and
cause the first code executing inside the SMRAM to perform a second sub-operation that does not require waiting for data to be transferred with the mass storage device to fulfill the request.

8. The system of claim 7 wherein the instructions for the handler further comprise instructions to perform the following:
exit system management mode before causing the second code to execute outside the SMRAM.

9. The system of claim 7 wherein the instructions for the handler further comprise instructions to perform the following:
update an execution status of the sub-operation in a communication buffer, wherein the communication buffer is accessible to the first code and the second code.

10. The system of claim 7 wherein the instructions for the handler further comprise instructions to perform the following:
re-enter system management mode after the second code has executed outside the SMRAM; and
use the execution status of the sub-operation in the communication buffer to determine a status of the requested service.

11. The system of claim 7 wherein
the request for the input/output service is a request for a legacy basic input/output system (BIOS) service.

12. The system of claim 7 wherein
the first code is a first portion of an extensible firmware interface (EFI) driver.

13. A computer program product comprising:
a computer-readable storage medium; and
instructions in the computer-readable storage medium, wherein the instructions, when executed in a processing system, cause the processing system to perform operations comprising:
receiving a request for an input/output service;
generating in response to the request a system management interrupt to enter a system management mode, wherein a system management RAM (SMRAM) coupled to the processor is accessible only to first code executing inside the SMRAM;
causing second code to execute outside the SMRAM to perform a sub-operation that requires waiting for data to be transferred with a mass storage device to fulfill the request; and
causing the first code executing inside the SMRAM to perform a second sub-operation that does not require waiting for data to be transferred with the mass storage device to fulfill the request.

14. The computer program product of claim 13 wherein the instructions further cause the processing system to perform operations comprising:
  exiting system management mode before causing the second code to execute outside the SMRAM.

15. The computer program product of claim 13 wherein the instructions further cause the processing system to perform operations comprising:
  updating an execution status of the sub-operation in a communication buffer, wherein the communication buffer is accessible to the first code and the second code.

16. The computer program product of claim 13 wherein the instructions further cause the processing system to perform operations comprising:
  re-entering system management mode after the second code has executed outside the SMRAM; and
  using the execution status of the sub-operation in the communication buffer to determine a status of the requested service.

17. The computer program product of claim 13 wherein the request for the input/output service is a request for a legacy basic input/output system (BIOS) service.

18. The computer program product of claim 13 wherein the first code is a first portion of an extensible firmware driver (EFI) driver.

* * * * *